(12) United States Patent
Rivas et al.

(10) Patent No.: US 12,418,189 B1
(45) Date of Patent: Sep. 16, 2025

(54) HIGH VOLTAGE DISCHARGE UNITS AND METHODS FOR DISCHARGING HIGH VOLTAGES

(71) Applicant: National Technology & Engineering Solutions of Sandia, LLC, Albuquerque, NM (US)

(72) Inventors: Raul Rivas, Albuquerque, NM (US); Mario J. Cortez, Albuquerque, NM (US); Eric D. Bloomquist, Albuquerque, NM (US); Rodney N. Owenby, Albuquerque, NM (US); Molly Brown, Tijeras, NM (US); Nathan A. Davey, Sandia Park, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 779 days.

(21) Appl. No.: 17/745,493

(22) Filed: May 16, 2022

Related U.S. Application Data

(60) Provisional application No. 63/189,301, filed on May 17, 2021.

(51) Int. Cl.
  *H01M 10/44* (2006.01)
  *H01M 10/46* (2006.01)
  *H02J 7/00* (2006.01)
  *H02J 7/34* (2006.01)

(52) U.S. Cl.
  CPC .......... *H02J 7/0047* (2013.01); *H02J 7/0063* (2013.01); *H02J 7/345* (2013.01)

(58) Field of Classification Search
  CPC ......... H02J 7/345; H02J 7/0063; H02J 7/0047
  USPC .................................. 320/107, 132, 135, 148
  See application file for complete search history.

(56) References Cited

U.S. PATENT DOCUMENTS 7,394,225 B2 * 7/2008 Guang ................ H02J 7/00047
                                                        320/141

* cited by examiner

*Primary Examiner* — Edward Tso
(74) *Attorney, Agent, or Firm* — Daniel J. Jenkins; Kenneth P. McNeill

(57) ABSTRACT

A system or method for discharging an energy source is disclosed. The system includes a circuit that provides a controlled discharge path through a relayed shunt-resistor network. A positive terminal and a negative terminal are provided for connecting the circuit to an external voltage source. A meter measures an instantaneous voltage of the external voltage source. A discharge switch is connected between the input terminal and the shunt-resistor network. A meter switch connects to the meter circuit to a voltage meter to display the voltage measured across the positive and negative terminal. The positive and negative terminals are electrically isolated when the discharge switch and the meter switch are switched to an open state. The high voltage discharge unit gently dissipates the stored energy on a capacitor, properly disabling a firing system, by providing a controlled discharge path through a relayed high voltage shunt resistor network.

20 Claims, 4 Drawing Sheets

HIGH VOLTAGE DISCHARGE UNITS AND METHODS FOR DISCHARGING HIGH VOLTAGES

CROSS-REFERENCE TO RELATED PATENT APPLICATIONS

This patent application claims the benefit of U.S. Provisional Patent Application Ser. No. 63/189,301, filed May 17, 2021, entitled "HIGH VOLTAGE DISCHARGE UNITS AND METHODS FOR DISCHARGING HIGH VOLTAGES", which is hereby incorporated by reference.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to electrical discharge units. The application relates more specifically to high voltage electrical discharge units.

In the past, High Voltage (HV) Direct Current (DC) energy sources have been discharged by mechanically applying a short circuit across the power source terminals. Such processes are unsafe and may lead to violent discharge leading to injury or death from electrocution.

What is needed are high voltage discharge units that overcome the deficiencies of the prior art by discharging HVDC energy sources in a controlled and safe manner.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a system for discharging an energy source. The system includes a circuit that provides a controlled discharge path through a relayed shunt-resistor network. A positive terminal and a negative terminal are provided for connecting the circuit to an external voltage source. A meter measures an instantaneous voltage of the external voltage source. A discharge switch is connected between the input terminal and the shunt-resistor network. A meter switch connects to the meter circuit to a voltage meter to display the voltage measured across the positive and negative terminal. The positive and negative terminals are electrically isolated when the discharge switch and the meter switch are switched to an open state.

Another embodiment relates to a method for discharging an energy source through a resistor network. The method includes providing a discharge circuit switch, a meter circuit switch, a dimmer switch and a short circuit switch; placing all switches in an open state; making HV connections by connecting a positive terminal and a negative terminal to an external voltage source via a pair of conductors; activating a HV discharge system by closing the dimmer switch and illuminated an LED indicator light, with the discharge circuit switch, the meter circuit switch, and the short circuit switch in an open state, disabling a high voltage divider network and a high voltage shunt networks; in response to the dimmer switch in the closed state and the discharge circuit switch, the meter circuit switch and the short circuit switch in the open state, displaying an LED Volt-meter value of zero kilovolts (0.00 KV); switching the meter switch to the closed state; displaying a high voltage potential value across the voltage source; switching the discharge switch to the closed position; and shunting across the terminals of the voltage source to dissipate the voltage source in a controlled path across a shunt resistor network.

Another embodiment relates to a high voltage discharge device. The high voltage discharge device includes a housing and a circuit board disposed within the housing. The circuit board includes a circuit that provides a controlled discharge path through a relayed shunt-resistor network. A positive terminal and a negative terminal are provided for connecting the circuit to an external voltage source. A meter circuit measures an instantaneous voltage of the external voltage source. A discharge switch is connected between the input terminal and the shunt-resistor network for discharging the external voltage source. A meter switch connects the meter circuit to a voltage meter to display the instantaneous voltage measured across the positive terminal and the negative terminal. The positive and negative terminals are electrically isolated when the discharge switch and the meter switch are switched to an open state; a low-resistive network for completely discharging the target load. The low-resistive network is connected to the positive terminal and the negative terminal through a shunt switch. The shunt switch is operable to completely discharge the external voltage source. A battery source powers the HV discharge device. A low battery indicator circuit is configured to cause an indicator LED to blink when the battery source falls below a predetermined voltage. The low battery indicator circuit is configured to cause the LED to remain on in response to an overvoltage or fault condition; wherein the system dissipates an energy source of up to 10,000 volts (10 KV) and a maximum energy of 600 Joules. The low-resistive network comprises a combined network equivalent of 125 kilo-ohms (KΩ).

Certain advantages of the embodiments described herein include a handheld device that allows a non-violent discharge of High Voltage Energy Sources such as High Voltage Capacitors or High Voltage Power Supplies.

The disclosed high voltage discharge unit gently dissipates the stored energy on a capacitor, properly disabling a firing system, by providing a controlled discharge path through a relayed high voltage shunt resistor network.

A Maximum Operating Voltage of 10,000 volts and Maximum Energy Dissipation of 600 Joules Maximum Capacitive Dissipation is provided. For example, if a capacitor is charged to V=10,000 volts [600=4C (10,000)$^2$], then the high voltage discharge unit can effectively dissipate the energy of a 12 μF [C=2*600/(10,000)2] capacitor.

The high voltage discharge unit includes a combined resistive network equivalent to 125 KΩ. To determine the approximate discharge time, to dissipate the energy on a capacitor; use five times the RC constant, where R=125 KΩ and C is the capacitor value (in Farads). For example, the time to discharge a 12 uF (0.000012 Farads) capacitor takes 5*R*C=5*(125,000Ω)*(0.000012 Farads); 5*R*C=5*1.5 5*R*C=7.5 seconds.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1:
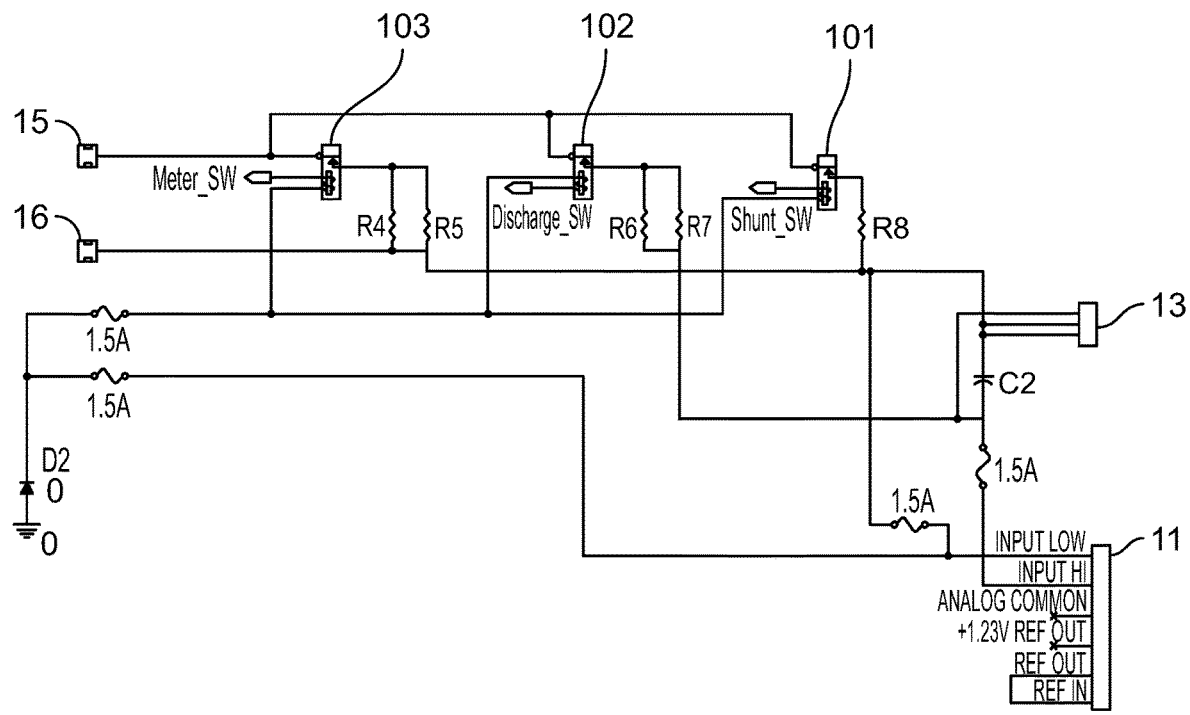
FIG. 1 shows a circuit schematic diagram for an exemplary embodiment of the high voltage discharge unit of the present disclosure.
Figure 1A:
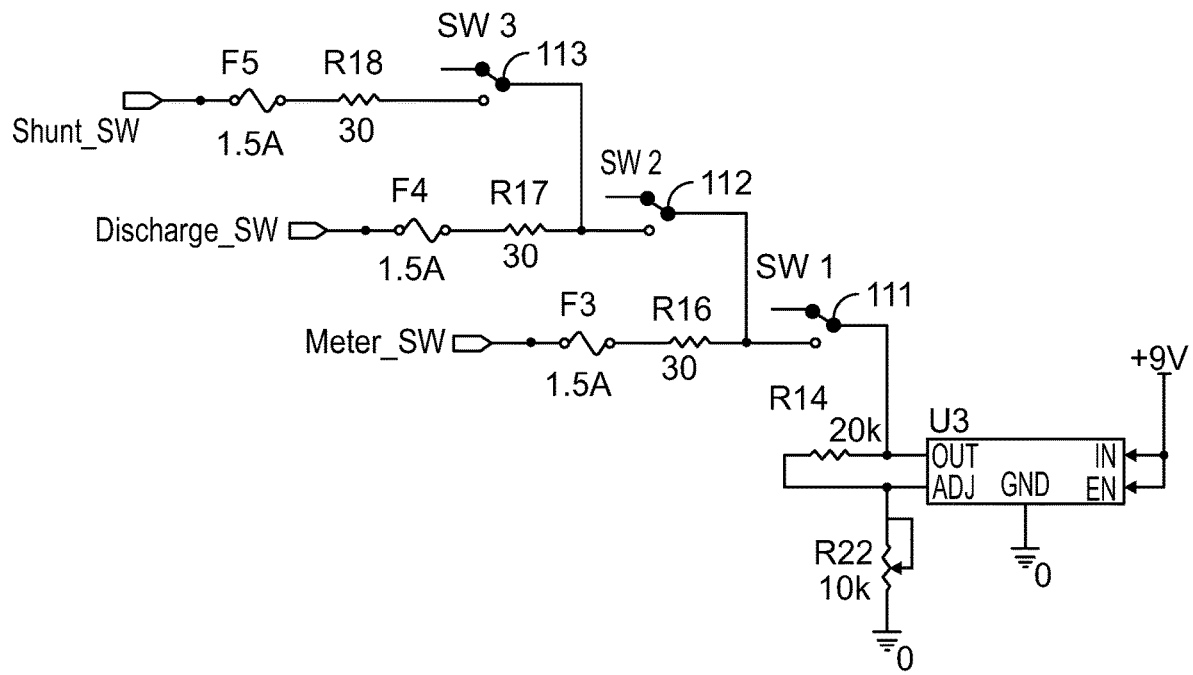
FIG. 1A shows a switch controller circuit schematic diagram for the circuit of FIG. 1.

Referring to FIGS. 1 and 1A, a circuit schematic diagram for an exemplary embodiment of the high voltage discharge unit is shown, and a switch controller circuit schematic diagram for the high voltage discharge unit is shown. A pair of device output connectors 15, 16 are provided for external connections to positive and negative terminals, respectively, of a DC voltage source (not shown). Positive terminal connector 15 connects the output DC high voltage leg to normally open contacts on relays 101, 102 and 103. Relays 101, 102 and 103 are preferably rated for 10 kilovolts (KV), and may be single-pole single throw relays. Shunt switch 113 energizes shunt relay 101 when closed, and provides control voltage to shunt relay 101 through a 30Ω series resistor R18 and a 1.5 ampere (A) fuse F5. Discharge switch 112 energizes discharge relay 102 and provides control voltage to discharge relay 102 through a 302 series resistor R17 and a 1.5 ampere (A) fuse F4. Meter switch 111 energizes meter relay 103 and provides control voltage to meter relay 103 through a 30Ω series resistor R16 and a 1.5 ampere (A) fuse F3.

Meter switch 11 receives control voltage 9 volts DC (VDC) from a voltage regulator U3. Closing meter switch 111 closes HV contacts on meter relay 103, and applies input HV to parallel connected meter resistors R4, R5, each of which having a resistance value of 1 GΩ. Resistor R4, R5 are connected in common on their opposite terminal to negative output terminal 16, and to an input high terminal on junction block 11. When closed, meter switch connects the meter circuit to a voltage meter to display the instantaneous voltage measured across the positive terminal 15 and the negative terminal 16.

Discharge switch 112 receives control voltage from meter switch 111 when meter switch closes. Closing discharge switch 112 closes HV contacts on discharge relay 102, and applies input HV to parallel connected discharge resistors R6, R7, each of which having a resistance value of 250 kΩ. Resistors R6, R7 are connected in common on their opposite terminal to 1 microfarad capacitor C2, and to the input high terminal on junction block 11. Negative output terminal 16 is connected to the opposite terminal of C2.

Shunt switch 113 receives control voltage from discharge switch 112 when discharge switch is placed in the closed position. Closing shunt switch 113 closes HV contacts on shunt relay 101, and applies input HV to shunt resistor R8 having a resistance value of 10Ω. Resistor R8 is connected on common terminal to device negative output terminal 16, and to low input terminal on junction block 11, through fuse 22. Positive and negative terminals 15, 16 are electrically isolated when discharge switch 112 and the meter switch 111 are switched to an open state. Shunt switch 113 connects HV from Positive terminal 15 to low-resistive shunt network R8, and completely discharges the target load. The low-resistive network is connected to the positive terminal and the negative terminal through shunt switch 113.

Figure 2:
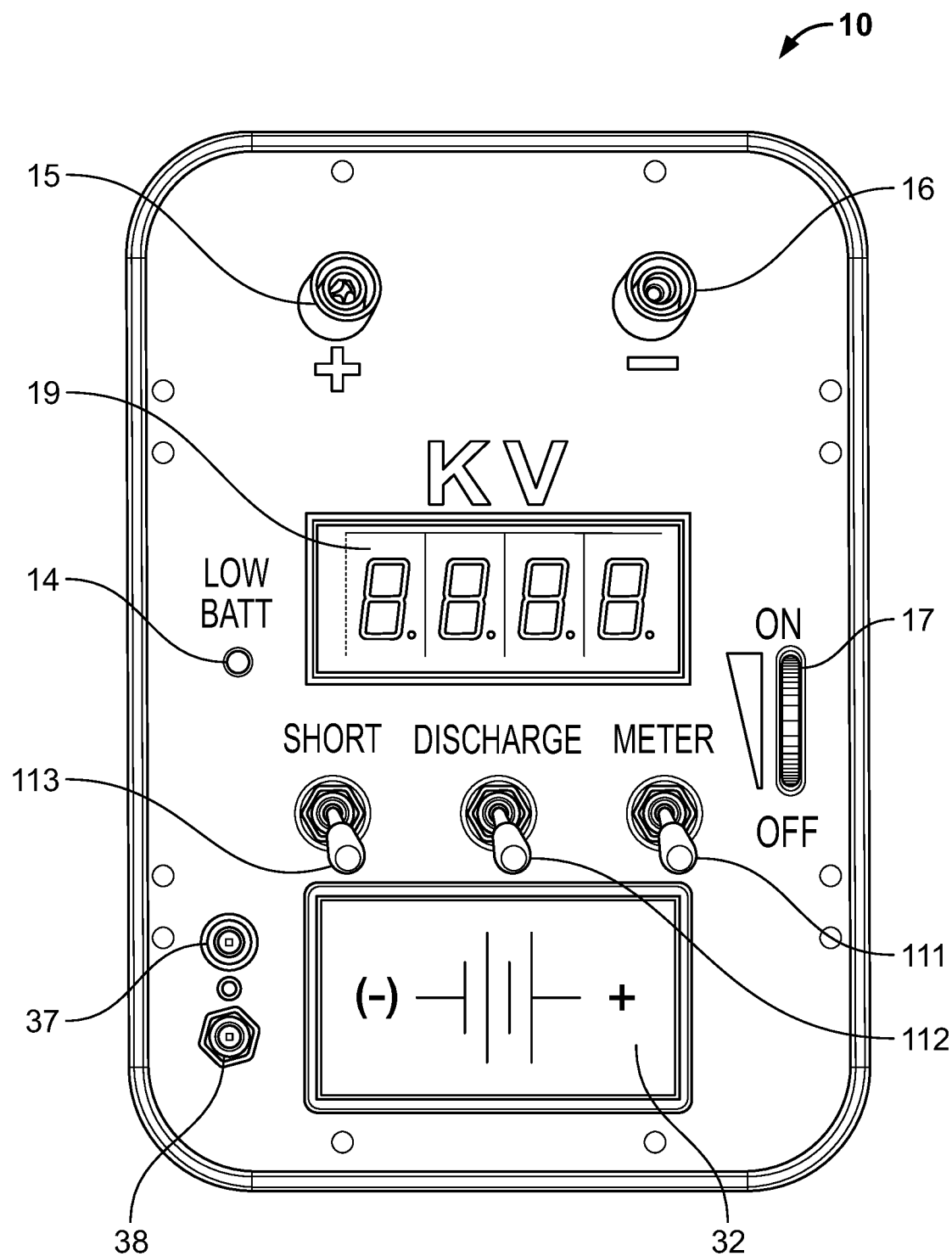
FIG. 2 shows an exemplary user control interface for the high voltage discharge meter.

Referring to FIG. 2, a user control interface 10 is shown. Terminals 15 and 16 provide jack connectors for positive and negative HV inputs respectively. A low battery LED indicator light 14 indicates a low batter condition when lit. Dimmer switch 17 is a thumb-wheel type dimmer for adjusting the backlighting of voltmeter display 19. Display 19 indicates kilovolts applied to terminals 15, 16. Toggle switches are provided for shunt switch 113, discharge switch 112 and meter switch 111. Battery 32 is visible without the battery cover (not shown). Bypass terminals 37, 38, provide a parallel battery connection for hot swapping a low battery.

Figure 3:
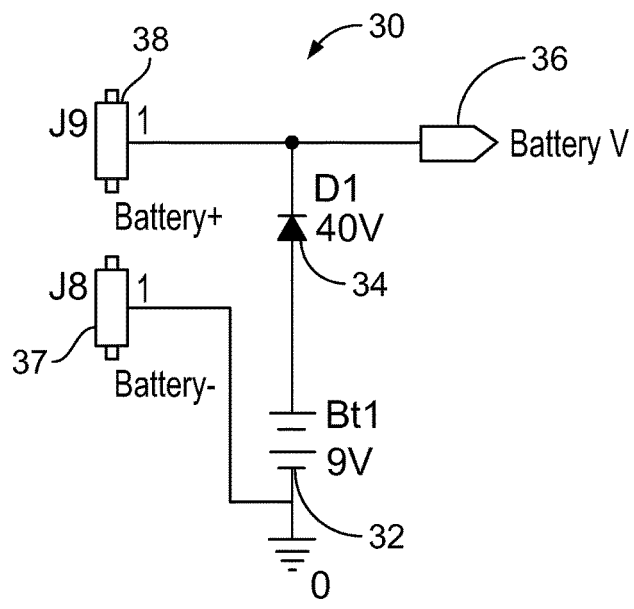
FIG. 3 shows a battery circuit of the high voltage discharge unit for the high voltage discharge meter.

Referring next to FIG. 3, a battery circuit 30 is shown for powering the system. Circuit 30 includes a 9 VDC battery 32 connected in series with a blocking diode 34. A battery output terminal 36 provides control voltage to the system. External bypass terminals 37, 38, are optionally provided for connecting a parallel battery source for hot swapping a low battery while the discharge unit is in use without affecting functionality. An external 9 VDC battery may be connected to terminals 37, 38 on the front of the discharge unit (FIG. 2). Internal battery 32 may then be replaced at the next available opportunity.

Figure 4:
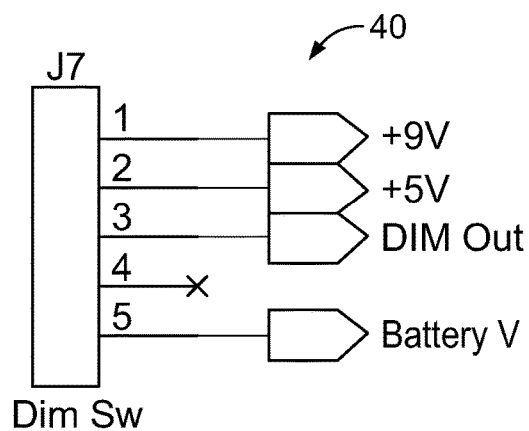
FIG. 4 shows a circuit schematic diagram for a dimmer switch of the high voltage discharge meter.

Referring next to FIG. 4, a dimmer switch circuit 40 powers the discharge unit "ON" by turning the thumbwheel. Continued turning of the thumb-wheel 17 adjusts the light intensity of the LED voltmeter 19. Rotating thumbwheel 17 downward turns the discharge unit off.

Figure 5:
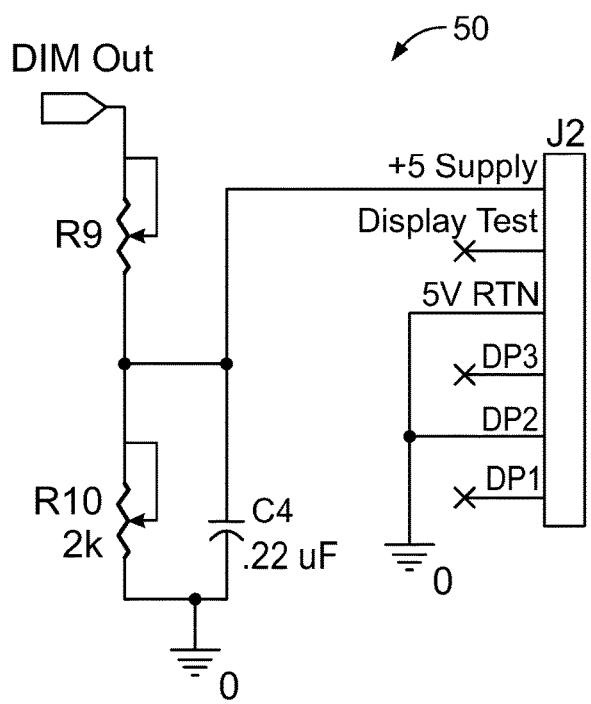
FIG. 5 shows a backlight control circuit schematic diagram of the high voltage discharge meter.

Referring to FIG. 5, a backlight control circuit 50 is shown. Circuit 50 is connected to dimmer switch 40 and provides potentiometers R9, and R10 for adjusting the brightness of volt meter display 19.

Figure 6:
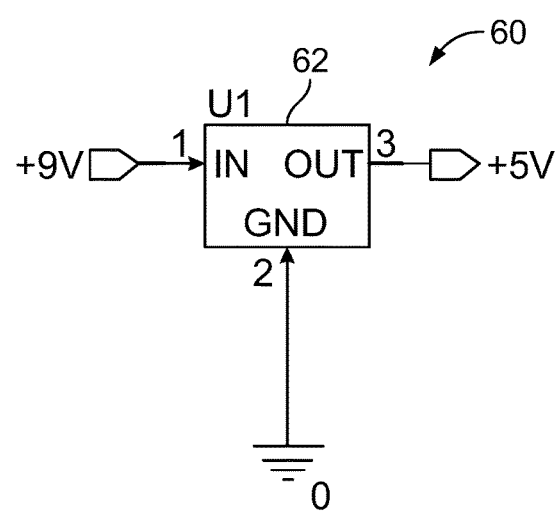
FIG. 6 shows a voltage regulator circuit schematic diagram of the high voltage discharge meter.

Referring to FIG. 6, a voltage regulator circuit 60 is shown. A low dropout linear regulator 62 provides 5 VDC output voltage for powering the high voltage discharge meter. Input voltage for regulator 62 is 9 VDC.

Figure 7:
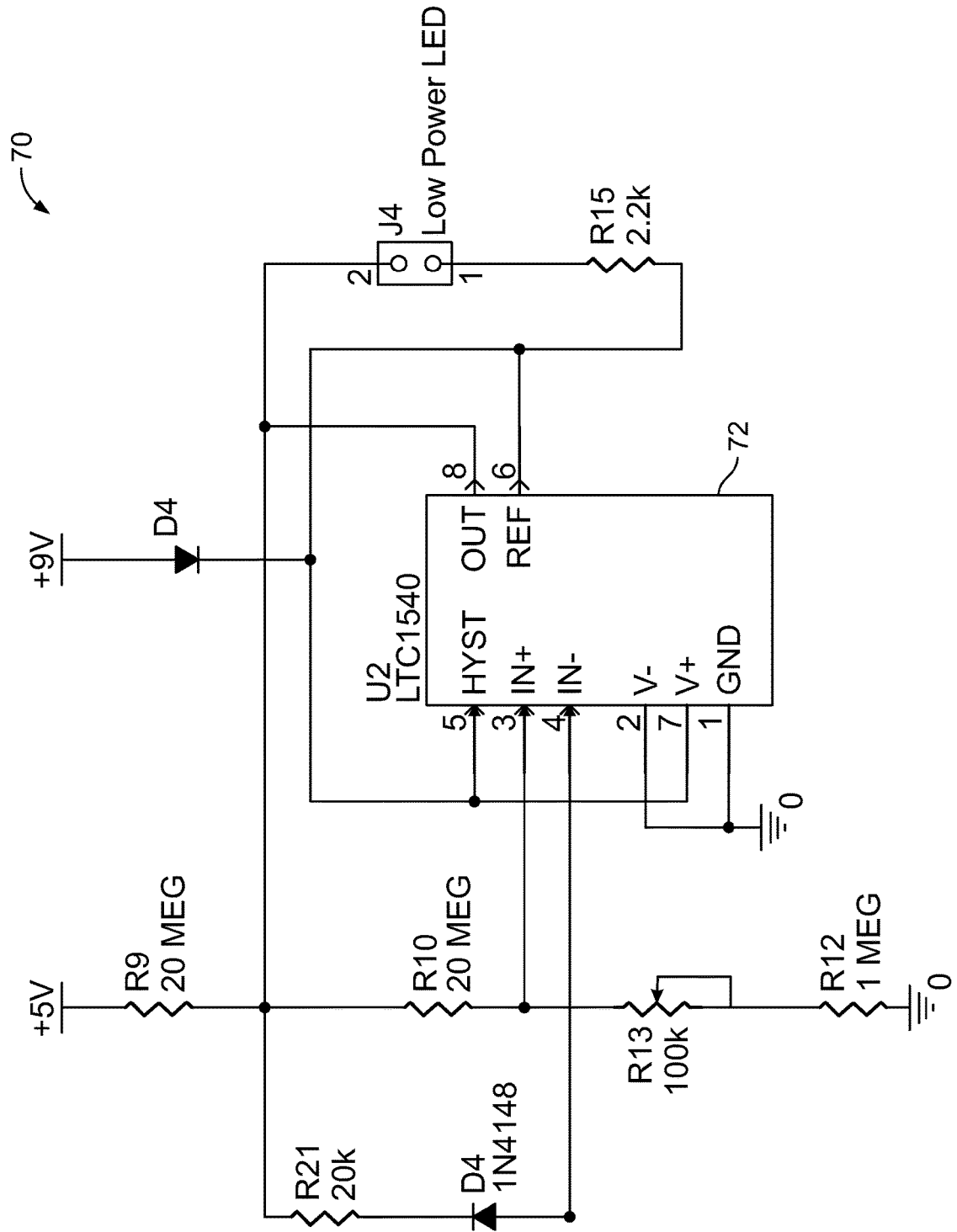
FIG. 7 shows a low power detector circuit schematic diagram of the high voltage discharge meter.

Referring to FIG. 7, a low power detector circuit 70 has a comparator 72 for comparing a reference voltage with the measured battery voltage. LED 14 begins to blink when the measured internal battery voltage falls below a functional voltage threshold, e.g., approximately 7 VDC.

If the Low Battery Indicator remains a solid blue, this may indicate a fault/over voltage. In this case, the unit is designed to continue functioning properly; however, it should be examined for a full diagnosis.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the high voltage discharge unit as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A system for discharging an energy source, comprising:
 a circuit that provides a controlled discharge path through a relayed shunt-resistor network; a positive terminal and a negative terminal for connecting the circuit to an external voltage source;
 a meter circuit for measuring an instantaneous voltage of the external voltage source;
 a discharge switch connected between the input terminal and the shunt-resistor network, the discharge switch configured to the external voltage source; and
 a meter switch connected to the meter circuit for connecting the meter circuit to a voltage meter to display the instantaneous voltage measured across the positive terminal and the negative terminal;
 wherein the positive and negative terminals are electrically isolated when the discharge switch and the meter switch are switched to an open state.

2. The system of claim 1, further comprising a low-resistive network for completely discharging a target load; the low-resistive network connected to the positive terminal and the negative terminal through a short switch; the short switch operable to completely discharge the external voltage source.

3. The system of claim 1, further comprising a battery source for powering the system.

4. The system of claim 1, further comprising a low battery indicator circuit comprising an LED, the low battery indicator circuit configured to cause the LED to blink when the battery source falls below a predetermined voltage; and wherein the low battery indicator circuit is configured to cause the LED to remain on in response to an overvoltage or fault condition.

5. The system of claim 1, wherein the system is configured to dissipate an energy source of up to 10,000 volts (10 KV) and to dissipate a maximum energy of 600 Joules.

6. The system of claim 1, wherein the shunt-resistor network comprises a combined network equivalent of 125 kilo-ohms (KΩ).

7. The system of claim 1, wherein the energy source is a high voltage capacitor; and wherein a maximum capacitance of the system is 12 microfarads (µF) at 10 KV.

8. The system of claim 1, further comprising a dimmer switch; the dimmer switch configured to switch the system to connect the system to the positive and negative terminals, and to adjust an intensity of a voltage display.

9. The system of claim 1, wherein the voltage meter comprises an LED display connected across the positive terminal and the negative terminal; wherein the display operates at a ratio of 1000:1 and displays a voltage value in kilovolts; the LED display further comprising a polarity indication to show a negative sign if the terminals are reversed.

10. The system of claim 3, further comprising a hot swap pair of terminals for connecting an external battery, the hot swap terminals configured to maintain a system power while replacing the battery source.

11. A method for discharging an energy source, comprising:
 providing a discharge circuit switch, a meter circuit switch, a dimmer switch and a short circuit switch;
 placing all switches in an open state;
 making high voltage connections by connecting a positive terminal and a negative terminal to an external voltage source via a pair of conductors;
 activating a high voltage discharge system by closing the dimmer switch and illuminated an LED indicator light when making a high voltage connection, with the discharge circuit switch, the meter circuit switch, and the short circuit switch in an open state, disabling a high voltage divider network and a high voltage shunt networks;
 in response to the dimmer switch in the closed state and the discharge circuit switch, the meter circuit switch and the short circuit switch in the open state, displaying an LED Volt-meter value of zero kilovolts (0.00 KV);
 switching the meter switch to the closed state;
 displaying a high voltage potential value across the external voltage source;
 switching the discharge switch to the closed position; and
 shunting across the terminals of the external voltage source to dissipate the voltage source in a controlled path across a shunt-resistor network.

12. The method of claim 11, wherein the energy source is a high voltage capacitor or a power supply.

13. The method of claim 11, wherein the shunt-resistor network is a high-voltage shunt-resistor network.

14. The method of claim 11, further comprising:
providing a controlled discharge path through a relayed high-voltage shunt-resistor network.

15. The method of claim 11, wherein the shunt-resistor network has an equivalent resistance value of 125 KΩ.

16. The method of claim 15, wherein an approximate discharge time to dissipate a capacitor stored energy is five times an RC constant;
wherein the R is the equivalent resistance value; and
wherein C is a capacitor value in Farads.

17. The method of claim 16, wherein the time to discharge a 12 uF (0.000012 Farads) capacitor is 7.5 seconds.

18. The method of claim 16, wherein a maximum energy dissipation (E) of the high voltage discharge system is $E = \frac{1}{2} CV^2$, where V is Voltage.

19. The method of claim 18, wherein a maximum capacitive dissipation equals $2E/V^2$.

20. A high voltage discharge device comprising:
a housing and a circuit board disposed within the housing; the circuit board comprising:
a circuit that provides a controlled discharge path through a relayed shunt-resistor network; a positive terminal and a negative terminal for connecting the circuit to an external voltage source;
a meter circuit for measuring an instantaneous voltage of the external voltage source;
a discharge switch connected between the input terminal and the shunt-resistor network;
a meter switch connected to the meter circuit for connecting the meter circuit to a voltage meter to display the instantaneous voltage measured across the positive terminal and the negative terminal;
wherein the positive and negative terminals are electrically isolated when the discharge switch and the meter switch are switched to an open state;
a low-resistive network for completely discharging a target load; the low-resistive network connected to the positive terminal and the negative terminal through a short switch; the short switch operable to completely discharge the external voltage source;
a battery source for powering the device; and
a low battery indicator circuit comprising an LED, the low battery indicator circuit configured to cause the LED to blink when the battery source falls below a predetermined voltage; and
wherein the low battery indicator circuit is configured to cause the LED to remain on in response to an over-voltage or fault condition;
wherein the device is configured to dissipate an energy source of up to 10,000 volts (10 KV) and to dissipate a maximum energy of 600 Joules; and
wherein the relayed shunt-resistor network comprises a combined network equivalent of 125 kilo-ohms (KΩ).

* * * * *